United States Patent
McQuillen et al.

(10) Patent No.: US 10,403,148 B2
(45) Date of Patent: Sep. 3, 2019

(54) SYSTEM AND METHODS TO DETECT BLOCKED VEHICLES

(71) Applicant: Ford Global Technologies, LLC, Dearborn, MI (US)

(72) Inventors: Michael McQuillen, Warren, MI (US); Daniel A. Makled, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 15/719,442

(22) Filed: Sep. 28, 2017

(65) Prior Publication Data

US 2019/0096259 A1     Mar. 28, 2019

(51) Int. Cl.
    *G08G 1/16*     (2006.01)
    *G05D 1/00*     (2006.01)
    *B60Q 9/00*     (2006.01)

(52) U.S. Cl.
    CPC ............ *G08G 1/168* (2013.01); *B60Q 9/002* (2013.01); *G05D 1/0022* (2013.01); *B60Y 2400/301* (2013.01)

(58) Field of Classification Search
    CPC ...... G08G 1/168; B60Q 9/002; G05D 1/0022; B60Y 2400/301
    See application file for complete search history.

(56) References Cited

U.S. PATENT DOCUMENTS

| | | | |
|---|---|---|---|
| 9,014,914 B2 | 4/2015 | Beaurepaire et al. | |
| 9,102,330 B2 | 8/2015 | Beaurepaire et al. | |
| 9,494,943 B2 | 11/2016 | Harvey | |
| 9,541,410 B1 | 1/2017 | Herbach et al. | |
| 9,558,659 B1 | 1/2017 | Silver et al. | |
| 2014/0309917 A1* | 10/2014 | Beaurepaire | G08G 1/017 701/300 |
| 2016/0274590 A1* | 9/2016 | Harvey | G05D 1/0088 |

FOREIGN PATENT DOCUMENTS

DE     102015218350 A1     3/2017

OTHER PUBLICATIONS

UTM Partners With FAVORIOT to Develop Smart Parking with Automated Double Park Detection System, IOT World, Apr. 19, 2017, 4 pages.

* cited by examiner

*Primary Examiner* — Calvin Cheung
(74) *Attorney, Agent, or Firm* — Frank Lollo; Neal, Gerber & Eisenberg LLP; James P. Muraff

(57) ABSTRACT

Method and apparatus are disclosed for systems and method to detect blocked vehicles. An example vehicle includes range detection sensors and a body control module. When the vehicle is parked, the body control module (a) scans, with the range detection sensors, the area around the vehicle to detect objects, (b) based on positions of the objects, determines whether the vehicle is able to maneuver out of its current parking spot, and (c) when the vehicle is not able to maneuver, sends an alert to a mobile device of a driver of the vehicle.

14 Claims, 3 Drawing Sheets

SYSTEM AND METHODS TO DETECT BLOCKED VEHICLES

TECHNICAL FIELD

The present disclosure generally relates to vehicle parking and, more specifically, systems and method to detect blocked vehicles.

BACKGROUND

Parking lot are often congested. Parking lots may be poorly designed and/or other vehicles may park inappropriately to cause a vehicle to be blocked into a parking space. In such situations, the block vehicle cannot exit the parking space until the blocking vehicle moves. Traditionally, the owner of the blocked vehicle can only detect that their vehicle is blocked when, upon returning to the vehicle, seeing that inappropriately parked vehicle. Often, because the driver of the blocking vehicle may be away from the vehicle by the time the condition is discovered, the owner of the blocked vehicle cannot take any corrective action.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Method and apparatus are disclosed for systems and method to detect blocked vehicles. An example vehicle includes range detection sensors and a body control module. When the vehicle is parked, the body control module (a) scans, with the range detection sensors, the area around the vehicle to detect objects, (b) based on positions of the objects, determines whether the vehicle is able to maneuver out of its current parking spot, and (c) when the vehicle is not able to maneuver, sends an alert to a mobile device of a driver of the vehicle.

A method to detect when a vehicle is blocked includes, when the vehicle is parked, (a) scanning, with a first type of range detection sensor, an area around the vehicle to detect objects, (b) based on positions of the objects, determining whether the vehicle is able to maneuver out of its current parking spot, and (c) when the vehicle is not able to maneuver, sending an alert to a mobile device of a driver of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
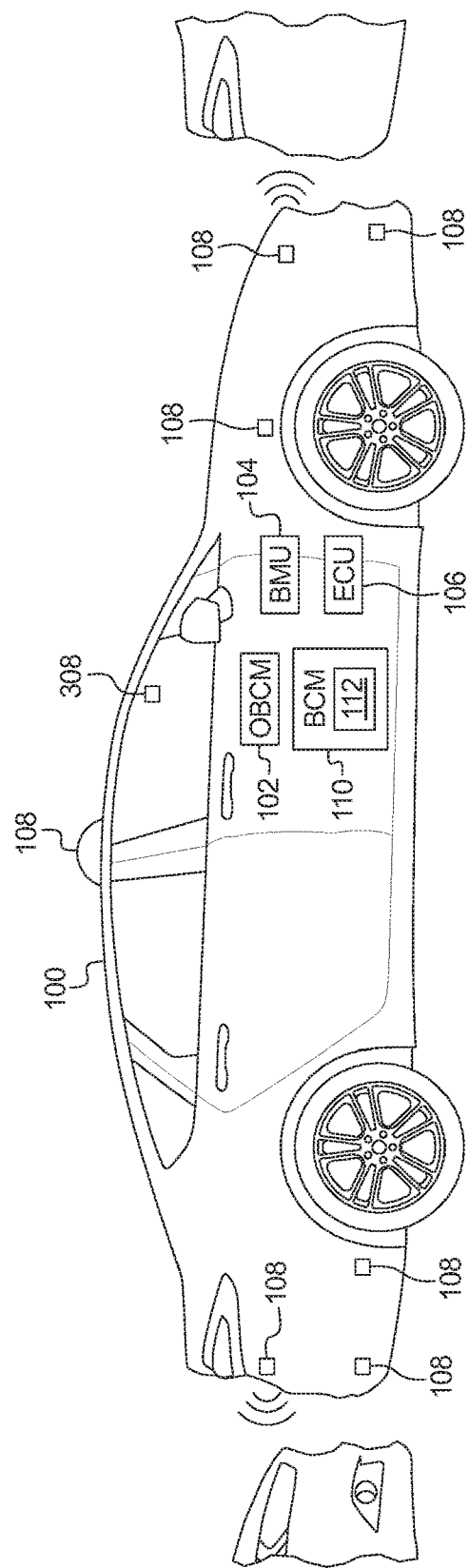
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

While parked, a host vehicle may be blocked by another vehicle in such a manner that the host vehicle cannot exit its location. For example, the vehicle may be parked in a spot in a poorly designed parking lot where the other vehicle parking in a valid parking spot may block the host vehicle. As another example, the other vehicle may double park in the street or block the host vehicle in a driveway. Often, the driver of the vehicle waits for the driver of the other vehicle to return.

As discussed below, the host vehicle, when parked, uses range detection sensors (e.g., ultrasonic sensors, radar, lidar, cameras, etc.) to detect when the host vehicle is blocked in by another vehicle. The host vehicle determines that it is blocked when there are objects in front of and behind the host vehicle and (a) there are objects and/or a curb to the side of the host vehicle such that there is not space for the host vehicle to maneuver out its current location or (b) there is not enough space in front of or behind the vehicle for the vehicle to maneuver out of its current location (e.g., in a parking spot in which the host vehicle parallel parked, etc.). When the host vehicle detects that it is blocked, the host vehicles takes one or more actions to notify the driver of the host vehicle, notify the driver of the other vehicle, and/or request the other vehicle move. In some examples, the host vehicle sends an alert to a mobile device (e.g., a smart phone, a smart watch, etc.) of the driver. In some examples, the host vehicle produces an audible or visual signal to alert the driver of the other vehicle. In some examples, when the other vehicle includes a vehicle-to-vehicle (V2V) system, the host vehicle sends a request for the other vehicle to move and/or sends an alert to the other vehicle to notify the corresponding driver.

The host vehicle scans the area proximate the vehicle based on the type of vehicle (e.g., a standard fuel vehicle, a battery electric vehicle (BEV), a hybrid electric vehicle (HEV), etc.). When the host vehicle is not dependent on a battery (e.g., is idling, is plugged in, etc.), the host vehicle continually scans the area proximate the host vehicle. When the host vehicle is being powered by a battery, the vehicle scans the area proximate the host vehicle intermittently based on a battery level. For example, when the state-of-charge (SoC) of the battery of the host vehicle is high, the scan frequency may be more frequent. In some examples, then host vehicle scans with a relatively low powered range detection sensor (e.g., the ultrasonic sensors, etc.) to make an initial determination of whether the host vehicle is blocked in. In some such examples, when the host vehicle makes an initial determination that the it is blocked, the host vehicle scans the other with other range detection sensors (e.g., radar, lidar, cameras, etc.) to confirm that the host vehicle is blocked.

FIG. 1 illustrates a host vehicle 100 operating in accordance with the teachings of this disclosure. The host vehicle 100 may be a standard gasoline powered vehicle, a hybrid vehicle, an electric vehicle, a fuel cell vehicle, and/or any other mobility implement type of vehicle. The host vehicle 100 includes parts related to mobility, such as a power train with an engine, a transmission, a suspension, a driveshaft, and/or wheels, etc. The host vehicle 100 may be non-autonomous, semi-autonomous (e.g., some routine motive functions controlled by the host vehicle 100), or autonomous (e.g., motive functions are controlled by the host vehicle 100 without direct driver input). In the illustrated example the host vehicle 100 includes an on-board communication module (OBCM) 102, a battery management unit (BMU) 104, an engine control unit (ECU) 106, range detection sensor 108, and a body control module (BCM) 110.

The on-board communication module 102 includes wired or wireless network interfaces to enable communication with external networks. The on-board communication module 102 also includes hardware (e.g., processors, memory, storage, antenna, etc.) and software to control the wired or wireless network interfaces. In the illustrated example, the on-board communication module 102 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11ad), etc.). Additionally or alternatively, in some examples, the on-board communication module 102 includes a vehicle-to-vehicle (V2V) communication controller. In some such examples, the V2V communication controller includes antenna(s), radio(s) and software to broadcast messages and to establish connections between vehicles, infrastructure-based modules, and mobile device-based modules. In some such examples, the V2V communication controller implements the Dedicated Short Range Communication (DSRC) protocol. More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. In some examples, the on-board communication module 102 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the host vehicle 100 may communicated with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The battery management unit 104 monitors the parameters of a vehicle battery, such as voltage of the battery and voltages of individual battery cells, average battery temperature, the state-of-charge (SoC), and/or current, etc. The SoC measures a percentage of the useful charge of the battery (e.g., the percentage between the peak charge voltage and the end of discharge voltage). The battery management unit 104 provides the current SoC to the other electronics in the host vehicle 100. Additionally, the battery management unit 104 protects the battery from over-current conditions, over-voltage conditions while charging, over-temperature conditions, and/or ground faults, etc. When the host vehicle 100 is a BEV, the battery management unit 104 provides the current charging state (e.g., the host vehicle 100 is plugged in or unplugged, etc.). In a standard vehicle, the battery typically a 12 volt battery. A BEV and/or an HEV may include the 12 volt battery and/or a high voltage battery that power the range detection sensors 108 through a 12 volt transformer.

When the host vehicle 100 is a standard-fuel vehicle or a HEV, the engine control unit 106 engine monitors and controls parameters of the engine (e.g., variable cam timing, ignition timing, RPM limiting, etc.). The engine control unit 106 provides the state of the engine to the other electronics in the host vehicle 100.

The range detection sensors 108 include one or more of ultrasonic sensors, radar, lidar, and/or cameras, etc. The range detection sensors 108 detect objects around the parameter of the host vehicle 100 at a range specific to each type of the range detection sensors. For example, the ultrasonic sensors may have a range of 2.5 meters (8.2 feet) and the radar may have a range of 30 meters (98.4 feet). In some examples, the ultrasonic sensors are used to determine whether there is an obstacle in front of and behind the host vehicle 100. Subsequently, another type of range detection sensor 108 (such as the lidar) is used to confirm that there is an obstacle in front of and behind the host vehicle 100 and that there is not enough room to maneuver out of the parked position (e.g., when there are not obstacles to the side of the host vehicle 100).

The body control unit 110 controls various subsystems of the host vehicle 100. For example, the body control unit 110 may control power windows, power locks, an immobilizer system, and/or power mirrors, etc. The body control unit 110 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. Additionally, in the illustrated example, the body control unit 110 includes a parking monitor 112. Alternatively, in some examples, the vehicle may includes a driver assist technology (DAT) module that includes the parking monitor 112 as well as other systems to perform autonomous and semi-autonomous functions (e.g., remote assist parking, lane change assist, blind spot monitoring, etc.) that use the range detection sensors 108.

The parking monitor 112 monitors the area around the host vehicle 100 with the range detection sensors 108 and autonomously acts when the host vehicle 100 is blocks so that it cannot leave its current parking spot. To monitor the area around the host vehicle 100, the parking monitor determines whether the host vehicle 100 is currently operating off of battery power. When the host vehicle 100 is a standard fuel vehicle, the parking monitor 112 determines, via the engine control unit 106, whether the engine is idling (e.g., the host vehicle 100 is not dependent on battery power). When the host vehicle 100 is a BEV or a plug-in HEV, the parking monitor 112 determines whether the host vehicle 100 is plugged into a charging station (e.g., the host vehicle 100 is not dependent on battery power). When the host vehicle 100 is using battery power, the parking monitor 112, scans the area around the host vehicle 100 intermittently with one or more of the range detection sensors 108. In some example, the frequency of the scans is based on the SoC of the vehicle battery. For example, when the vehicle battery is above 90% SoC, the parking monitor 112 may scan the area around the host vehicle 100 every second and when the vehicle battery is between 80% and 90% SoC, the parking monitor 112 may scan the area around the host vehicle 100 every five seconds. Additionally, in some examples, the parking monitor slows the scanning frequency over time as the host vehicle 100 remains parked.

The parking monitor 112 determines when the host vehicle 100 is trapped by obstacles based on the initial scans by the range detection sensors 108. The host vehicle 100 is trapped when, taking into account the distances to the obstacles and the dimensions of the host vehicle 100, it cannot maneuver out of its current parking spot due to the obstacles. In some examples, when one type of range detection sensor 108 (e.g., the ultrasonic sensors, etc.) determines that the host vehicle 100 may be trapped, the parking monitor 112 scans with a different range detection sensor (e.g., the lidar, etc.) to confirm that the host vehicle 100 is trapped. In some examples, after the parking monitor 112 determines that the host vehicle 100 is trapped, the parking monitor 112 waits a threshold period of time (e.g., thirty seconds, one minute, five minutes, etc.) and then rescans to determine whether the host vehicle 100 is still trapped. In such a manner, the parking monitor 112 can less a risk of detecting false positive when the situation that is causing the host vehicle 100 to be trapped is transitory.

In some examples, the parking monitor 112 constructs an occupancy map around the host vehicle 100. The occupancy map defines regions around the host vehicle 100 that are indicated as occupied or unoccupied based on the object detected by the range detection sensors 108. In some such examples, the regions are arranged around the host vehicle 100 such that the regions extend around the host vehicle 100 in concentric rows. In such examples, the parking monitor 112 determines that the host vehicle 100 is trapped when the regions in the occupancy map are occupied such that the host vehicle 100 cannot maneuver out of its current parking spot.

The parking monitor 112 reacts when it determines that the host vehicle 100 is trapped. In some examples, the parking monitor 112 causes an audible alert (e.g., via a horn and/or alarm, etc.) or a visual alert (e.g., via the head lights and/or tail lights, etc.) to inform the driver of the other vehicle that the host vehicle 100 is trapped. Alternatively or additionally, in some examples, the parking monitor 112, via the on-board communication module 102, sends a message (e.g., via an server on an external network) to a mobile device of the driver of the host vehicle 100. For example, the parking monitor 112 may send an Short Message Service (SMS) message, an e-mail message, and/or an instant messenger message, etc. In some such examples, the message includes one or more images or data (e.g., distances, measurements, etc.) captured by the range detection sensors 108. Alternatively or additionally, the parking monitor 112 determines whether the other vehicle(s) around the host vehicle 100 are V2V-enabled (e.g., includes V2V modules that are broadcasting V2V messages, etc.). When the other vehicles are V2V-enabled, the parking monitor 112 broadcasts a message requesting one or more of the blocking vehicles to relocate and/or send an alert to their respective drivers.

Additionally, in some examples, the parking monitor 112 determines whether the host vehicle is trapped as part of a path planning system that determines a set of trajectories for navigation systems, such as remote assist parking and autonomous valet parking, etc. Path planning is typically an algorithm which produces a representation of vehicle trajectory as a polynomial through free space.

Figure 2:
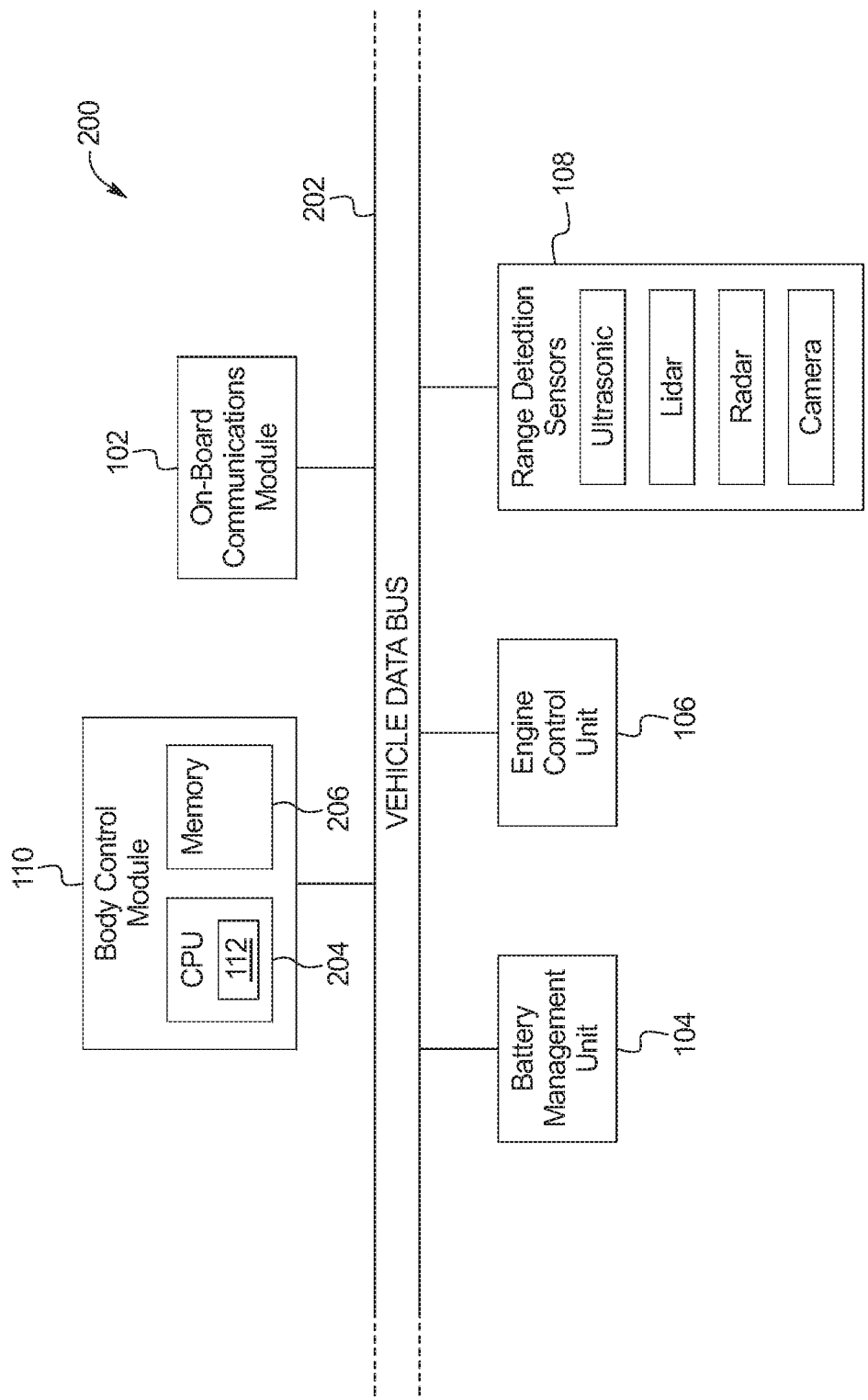
FIG. 2 is a block diagram of electronic components of the vehicle of FIG. 1.

FIG. 2 is a block diagram of electronic components 200 of the host vehicle 100 of FIG. 1. In the illustrated example, the electronic components 200 include the on-board communication module 102, the battery management unit 104, the engine control unit 106, the range detection sensors 108, the body control unit 110, and a vehicle data bus 202.

The body control unit 110 includes a processor or controller 204 and memory 206. In the illustrated example, the body control unit 110 is structured to include parking monitor 112. The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 206 includes multiple kinds of memory, particularly volatile memory and non-volatile memory.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 202 communicatively couples the on-board communication module 102, the battery management unit 104, the engine control unit 106, the range detection sensors 108, and the body control unit 110. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
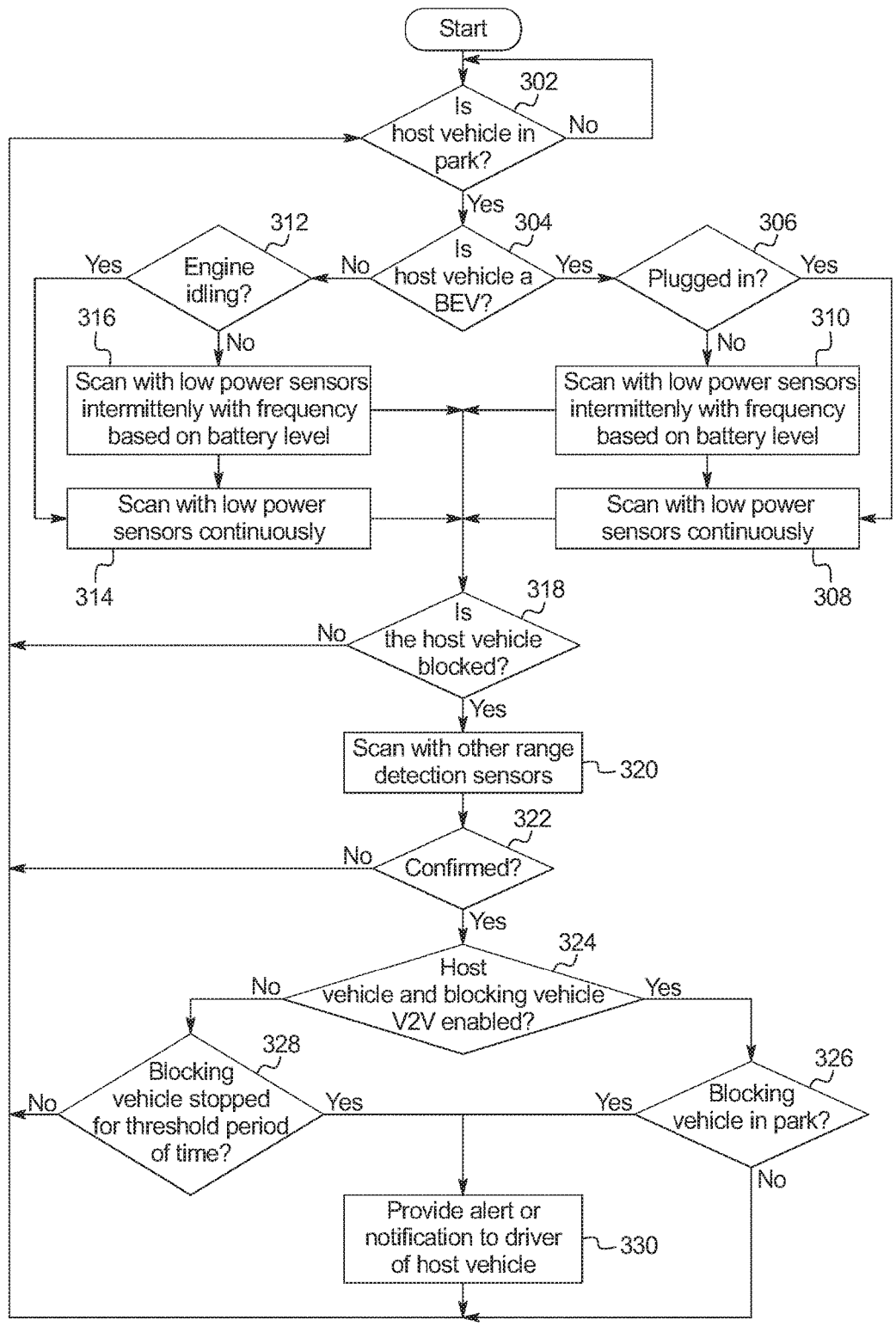
FIG. 3 is a flowchart of a method to detected when a vehicle is blocked, which may be implemented by the electronic components of FIG. 2.

FIG. 3 is a flowchart of a method to detected when the host vehicle 100 is blocked, which may be implemented by the electronic components 200 of FIG. 2. Initially, at block 302, the parking monitor 112 waits until the host vehicle 100 is parked. At block 304, the parking monitor 112 determines whether the host vehicle 100 is a battery electric vehicle (BEV). When the host vehicle 100 is a BEV, the method continues at block 306. Otherwise, when the host vehicle 100 is not a BEV, the method continues at block 312. At block 306, the parking monitor 112 determines whether the host vehicle 100 is plugged in. When the host vehicle 100 is plugged in, the method continues at block 308. Otherwise, when the host vehicle 100 is not plugged in, the method continues at block 310. At block 308, the parking monitor 112 scans the area around the host vehicle 100 with the range detection sensors 108 continuously. At block 310, the parking monitor 112 scans the area around the host vehicle 100 with the range detection sensors 108 intermittently with a scan frequency based on the SoC of the battery.

At block 312, the parking monitor 112 determines whether the engine of the host vehicle 100 is idling. If the engine is idling, the method continues at block 314. Otherwise, if the engine is not idling, the method continues at block 316. At block 314, the parking monitor 112 scans the area around the host vehicle 100 with the range detection sensors 108 continuously. At block 316, the parking monitor 112 scans the area around the host vehicle 100 with the range detection sensors 108 intermittently with a scan frequency based on the SoC of the battery.

At block 318, based on the scans of the area around the host vehicle 100, the parking monitor determines whether the host vehicle 100 is blocked. When the host vehicle 100 is blocked, the method continues at block 320. When the host vehicle 100 is not blocked, the method returns to block 302. At block 320, the parking monitor 112 wakes up a different type of the range detection sensors 108 and scans the area around the host vehicle 100. At block 322, the parking monitor 112 determines whether the scans from the different one of the range detection sensors 108 confirms that the host vehicle 100 is blocked. When the scan confirms that the host vehicle 100 is blocked, the method continues to block 324. Otherwise, when the scan does not confirm that the host vehicle 100 is blocked, the method returns to block 302.

At block 324, the parking monitor 112 determines whether the host vehicle 100 and the blocking vehicle are V2V-enabled. For example, parking monitor 112 may determine that the blocking vehicle is V2V-enabled when the blocking vehicle periodically transmits V2V messages. When the blocking vehicle is V2V enabled, the method continues to block 326. Otherwise, when the blocking vehicle is not V2V enabled, the method continues at block 328. At block 326, the parking monitor 112 determines whether, based on messages from the blocking vehicle, whether the blocking vehicle transmission is shifted into park. When the blocking vehicle is shifted into park, the method continues to block 330. Otherwise, when the blocking vehicle is not shifted into park, the method returns to block 302. At block 328, the parking monitor 112 determines whether the blocking vehicle has stopped for a threshold period of time (e.g., one minute, five minutes, etc.). When the blocking vehicle has stopped for a threshold period of time, the method continues at block 330. Otherwise, when the block vehicle has not been stopped for a threshold period of time, the method returns to block 302. At block 330, the parking monitor 112 reacts to detecting the blocking vehicle by (i) providing a audible and/or visual alert, (ii) sending a message to the driver of the host vehicle 100, and/or (iii) sending a message to the blocking vehicle via V2V.

The flowchart of FIG. 3 is representative of machine readable instructions stored in memory (such as the memory 206 of FIG. 2) that comprise one or more programs that, when executed by a processor (such as the processor 204 of FIG. 2), cause the host vehicle 100 to implement the example parking monitor 112 of FIGS. 1 and 2. Further, although the example program(s) is/are described with reference to the flowchart illustrated in FIG. 3, many other methods of implementing the example parking monitor 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   range detection sensors;
   a body control module to, when the vehicle is parked:
      scan, with the range detection sensors, an area around the vehicle to detect objects;
      based on positions of the objects, determine whether the vehicle is able to maneuver out of its current parking spot;
      when the vehicle is not able to maneuver, send an alert to a mobile device of a driver of the vehicle, wherein the alert includes information derived from the range detection sensors.

2. The vehicle of claim 1, wherein when the body control module is to:
   scan, with a first one of the range detection sensors, the area around the vehicle to detect the objects; and
   when the objects are detected in front of and behind the vehicle, scan with a second one of the range detection sensors, the second one of the range detection sensors being a different type than the first one of the range detection sensors.

3. The vehicle of claim 1, wherein, when the vehicle is not able to maneuver, before sending the alert, the body control module is to wait a threshold period of time, and after the threshold period of time, send the alert after determining that the vehicle still cannot maneuver out of its current parking spot.

4. The vehicle of claim 1, wherein the body control module is to, when the vehicle is not able to maneuver, provide an audible and visual alert perceivable in the area around the vehicle.

5. The vehicle of claim 1, wherein the body control module is to, when the vehicle is not able to maneuver, broadcast a message requesting one of the objects repositions itself.

6. A vehicle comprising:
range detection sensors;
a body control module to, when the vehicle is parked:
scan, with the range detection sensors, an area around the vehicle to detect objects;
based on positions of the objects, determine whether the vehicle is able to maneuver out of its current parking spot;
when the vehicle is not able to maneuver, send an alert to a mobile device of a driver of the vehicle, wherein the body control module is to determine whether the vehicle is currently powered by a battery, and wherein when the vehicle is currently powered by the battery, to scan the area around the vehicle, the body control module is to intermittently scan the area at a frequency based on a state of charge of the battery.

7. The vehicle of claim 6, wherein when the vehicle is not currently powered by the battery, to scan the area around the vehicle, to scan the area around the vehicle, the body control module is to continuously scan the area.

8. A method to detect when a vehicle is blocked comprising:
when the vehicle is parked:
scanning, with a first type of range detection sensor, an area around the vehicle to detect objects;
based on positions of the objects, determining whether the vehicle is able to maneuver out of its current parking spot;
when the vehicle is not able to maneuver, sending an alert to a mobile device of a driver of the vehicle, wherein the alert include information derived from the range detection sensors.

9. The method of claim 8, including:
determining whether the vehicle is currently powered by a battery; and
when the vehicle is currently powered by the battery, to scanning the area around the vehicle intermittently at a frequency based on a state of charge of the battery.

10. The method of claim 9, including when the vehicle is not currently powered by the battery, scanning the area around the vehicle continuously.

11. The method of claim 8, including when the vehicle is not able to maneuver, before sending the alert, waiting a threshold period of time, and after the threshold period of time, sending the alert after determining that the vehicle still cannot maneuver out of its current parking spot.

12. The method of claim 8, including when the vehicle is not able to maneuver, providing an audible and visual alert perceivable in the area around the vehicle.

13. The method of claim 8, including when the vehicle is not able to maneuver, broadcasting a message requesting one of the objects repositions itself.

14. A method to detect when a vehicle is blocked comprising:
when the vehicle is parked:
scanning, with a first type of range detection sensor, an area around the vehicle to detect objects;
based on positions of the objects, determining whether the vehicle is able to maneuver out of its current parking spot;
when the vehicle is not able to maneuver, sending an alert to a mobile device of a driver of the vehicle; and
when the objects are detected in front of and behind the vehicle, scanning the area around the vehicle with a second type of the range detection sensor.

* * * * *